(12) United States Patent
Turner

(10) Patent No.: US 12,144,315 B2
(45) Date of Patent: Nov. 19, 2024

(54) LIFTING DEVICE AND METHOD OF USE

(71) Applicant: Danny Lee Turner, Shippensburg, PA (US)

(72) Inventor: Danny Lee Turner, Shippensburg, PA (US)

(*) Notice: Subject to any disclaimer, the term of this patent is extended or adjusted under 35 U.S.C. 154(b) by 112 days.

(21) Appl. No.: 17/742,467

(22) Filed: May 12, 2022

(65) Prior Publication Data

US 2023/0091657 A1 Mar. 23, 2023

Related U.S. Application Data

(60) Provisional application No. 63/247,367, filed on Sep. 23, 2021.

(51) Int. Cl.
*A01K 1/02* (2006.01)
*A01K 15/00* (2006.01)

(52) U.S. Cl.
CPC ............ *A01K 1/0236* (2013.01); *A01K 15/00* (2013.01)

(58) Field of Classification Search
CPC ..... A01K 1/0236; A01K 1/0254; A45F 5/102; A45F 2005/1033; B65G 7/12
USPC ................. 294/19.2, 137, 159, 173
See application file for complete search history.

(56) References Cited

U.S. PATENT DOCUMENTS

| | | |
|---|---|---|
| 451,452 A | 5/1891 | Burnett |
| 1,015,239 A | 1/1912 | Miller |
| 1,601,745 A * | 10/1926 | Swineford ............... A01D 7/06 56/400.21 |
| 1,659,130 A * | 2/1928 | Barnett ............... A01D 46/243 294/170 |
| 1,787,331 A * | 12/1930 | Wilson ................. B65G 7/12 294/118 |
| 1,876,422 A | 9/1932 | Johnson |
| 1,939,475 A | 12/1933 | Walsh |
| D201,010 S | 5/1965 | Koon et al. |
| 4,061,387 A * | 12/1977 | Lindbergh ............. A01K 73/06 294/26 |
| 4,311,332 A | 1/1982 | Walker |
| 4,463,977 A * | 8/1984 | Wyatt .................. B65G 7/12 294/26 |
| D344,661 S | 3/1994 | Schuele |
| 5,359,840 A | 11/1994 | Costar |
| 5,388,878 A * | 2/1995 | Smith .................. B65G 7/12 294/55.5 |
| 5,477,667 A | 12/1995 | Bryant |
| 5,758,915 A * | 6/1998 | Quinn .................. A63B 47/02 294/19.2 |

(Continued)

FOREIGN PATENT DOCUMENTS

| | | |
|---|---|---|
| CA | 2 423 370 | 9/2004 |
| FR | 3039968 | 2/2017 |

(Continued)

*Primary Examiner* — Dean J Kramer
(74) *Attorney, Agent, or Firm* — Bauer & Joseph

(57) ABSTRACT

A small animal lifting device has a u-shaped portion, a connector, and a handle. The u-shaped portion includes spaced apart tines that allow an animal's legs to pass through and extend beyond the tines and at the same time cradle the animal's body for lifting and transport. The connector links the handle to the tines and maintains the spaced apart arrangement of the tines. The handle is preferably centered with the u-shaped portion so the animal can be lifted based on its center of gravity.

10 Claims, 4 Drawing Sheets

(56) References Cited

U.S. PATENT DOCUMENTS

| | | | |
|---|---|---|---|
| D583,518 S | 12/2008 | Thorner | |
| 7,661,258 B1 | 2/2010 | Petruzelli | |
| 8,575,500 B1 * | 11/2013 | Genet, Sr. | G01G 19/58 177/148 |
| 8,607,740 B2 * | 12/2013 | Webb | A01K 1/0254 119/725 |
| 8,801,060 B1 * | 8/2014 | Smith | B65G 7/12 294/902 |
| 10,716,287 B2 | 7/2020 | Keith | |
| 2011/0056441 A1 | 3/2011 | Chang | |
| 2016/0302902 A1 | 10/2016 | Wolfsberger et al. | |

FOREIGN PATENT DOCUMENTS

| | | | | |
|---|---|---|---|---|
| GB | 1553047 A * | 9/1979 | | A45C 13/38 |
| GB | 2 252 543 | 8/1992 | | |

* cited by examiner

LIFTING DEVICE AND METHOD OF USE

This application claims priority from application No. 63/247,367 under 35 USC § 119(e), which was filed on Sep. 23, 2021 and is herein incorporated in its entirety by reference.

FIELD OF THE INVENTION

A lifting device, especially intended for small animals and the like is configured to allow a person to easily lift one or more of the small animals for transport.

BACKGROUND OF THE INVENTION

Lambs and kids are often moved from a birthing area for further observation and care, with such movement including weighing, ear-tagging and/or other processing. It is important for the newborn to stay within close proximity and full-view of the mother to encourage the mother to follow along as the newborn is moved, say across a field to a shelter. The most common way is to use a sling made of fabric or plastic with two carrying handles or straps, which is cumbersome and may cover up much of the lamb. The slings do not secure the animal and the animal can often slide out the front or rear of the carrying device. With these kinds of slings, it is difficult to move more than one animal at a time. Therefore, a need exists to provide improved ways and devices to move these kinds of animals. The present invention responds to this need with an improved lifting device.

SUMMARY OF THE INVENTION

The inventive lifting device is intended to be used in an agricultural environment to facilitate the movement and handling of small animals, especially newborns, e.g., between 5 and 20 pounds. The device is made of lightweight materials with no moving parts that are required to secure the animal, but it does so by the nature of the shape of the tines/fingers that capture and support the animal. It allows a person to quickly secure and move a small animal from one place to another without touching the animal, and without having to use both hands to secure a sling around the animal.

The inventive lifting device securely captures the animal with its legs protruding through the fingers or tines and its body securely positioned between the inside curvature and inside surfaces of the fingers/tines. The animal can be moved in a way that it appears to be naturally walking, and two or more animals can be captured and moved at the same time, which is very difficult to do with a flexible sling, as that takes two hands to capture the animal.

In actuality, there could be up to four newborns transported by using multiple devices in each hand, with them preferably facing in opposing directions. The ability for this mass transport is advantageous in that a mother can follow all of her lambs at the same time without unnecessary stress to the lambs, mother and/or handler.

In addition to using the invention to transport newborns and facilitate the following of the mother, it is also most convenient for weighing the newborn which is part of many farm programs. The inventive lifting device can incorporate a scale to make the weighing process even easier or be used with a separate scale for weighing purposes.

The inventive lifting device also allows for greater reach into a pen for a handler to pick up an animal without having to enter into the pen. The animal can be quickly and one-handedly captured, and securely raised up for weighing, ear tagging, naval dipping and other processes as well as a full-body visual inspection. The inventive device allows for one person to conveniently perform the required tasks of processing newborns.

DETAILED DESCRIPTION OF THE INVENTION

Figure 5:
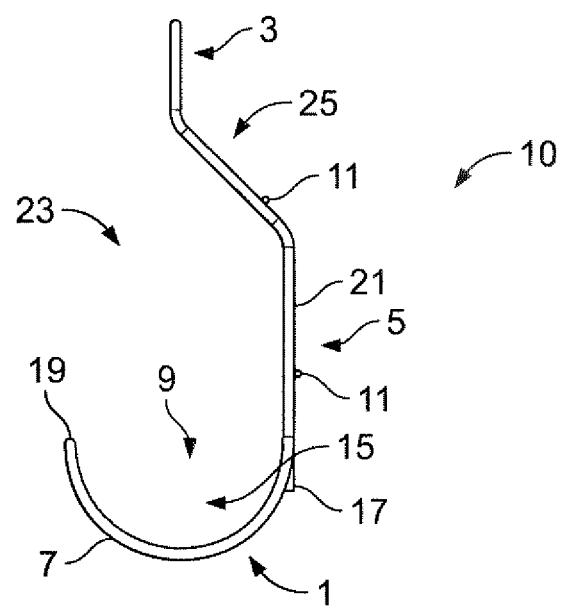
FIG. 5 is a side view of the lifting device of FIG. 1.

One embodiment of the inventive small animal lifting device (hereinafter lifting device) is shown in FIGS. 1-5. The lifting device is designated by the reference numeral 10 and has three main components as best seen in FIG. 5, a u-shaped portion 1, a handle, 3, and a connector 5.

The u-shaped portion 1 has a plurality of fingers or tines 7 (hereinafter tines), with a portion of the tines forming a u-shape 9. In this embodiment, the connector 5 includes structure, e.g., cross members 11 for example, that maintain the tines 7 in a spaced apart relationship.

This spaced apart relationship results in a space 13 between adjacent tines as well as a space 15 formed collectively by the u-shape 9 of the tines 7. These spaces provide two functions. The space 13 between adjacent tines allows the legs of an animal to pass through and extend beyond the tines 7. The spaced-apart tines forming the u-shape 9 along the length of the device allows the u-shaped portion 1 to receive an animal body for resting on the tines for lifting and movement to a desired location. The u-shape 9 of the tines, and possibly a part of the connector 5, depending on the size of the animal, keeps the animal held in place during lifting and movement.

A lower part 17 of the connector 5 is positioned away or opposite from free ends 19 of the tines 7 so as to allow for the tines 7 to pass under the body of the small animal and then nestle the body into the u-shape portion 1. Once the body is nestled into the u-shape of the tines, the entire device can be raised using the handle 3.

The connector 5 is also configured with a vertical section 21. By having the vertical section 21, a space 23 above the u-shape 9 and space 15 formed by the tines 7 is provided to receive the animal when engaging the animal with the tines 7 and, when the device is lowered to disengage the animal body from the u-shaped tines 7, a way for the animal to exit the device. That is, once the tines are lowered from the animal, the animal moves up and out of the u-shaped portion 1 into the space 15 above it.

Figure 1:
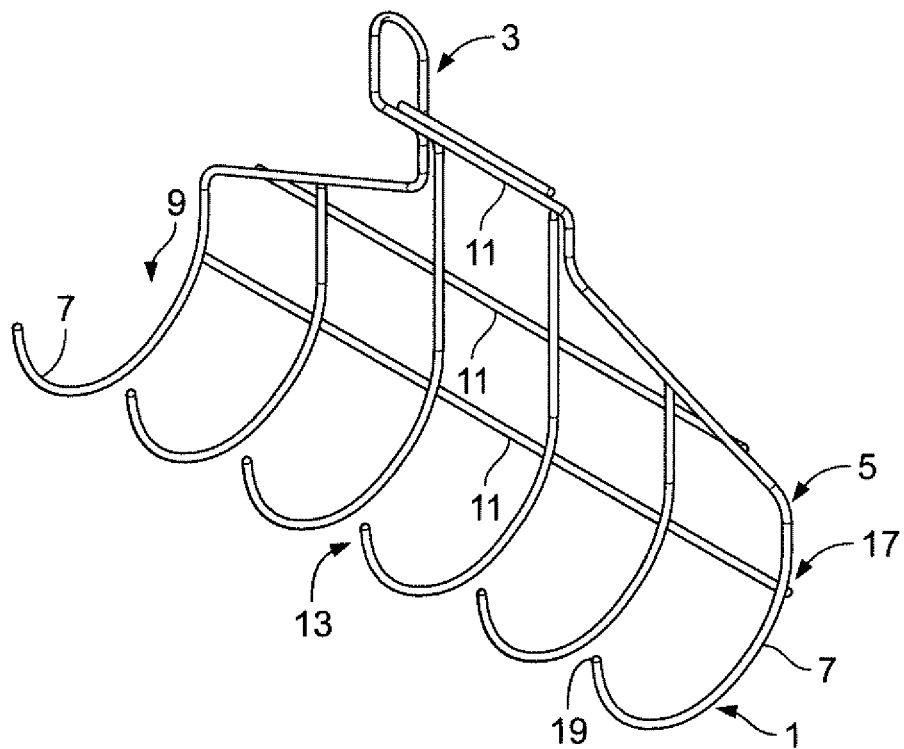
FIG. 1 is a rear perspective view of one embodiment of the inventive lifting device.
Figure 2:
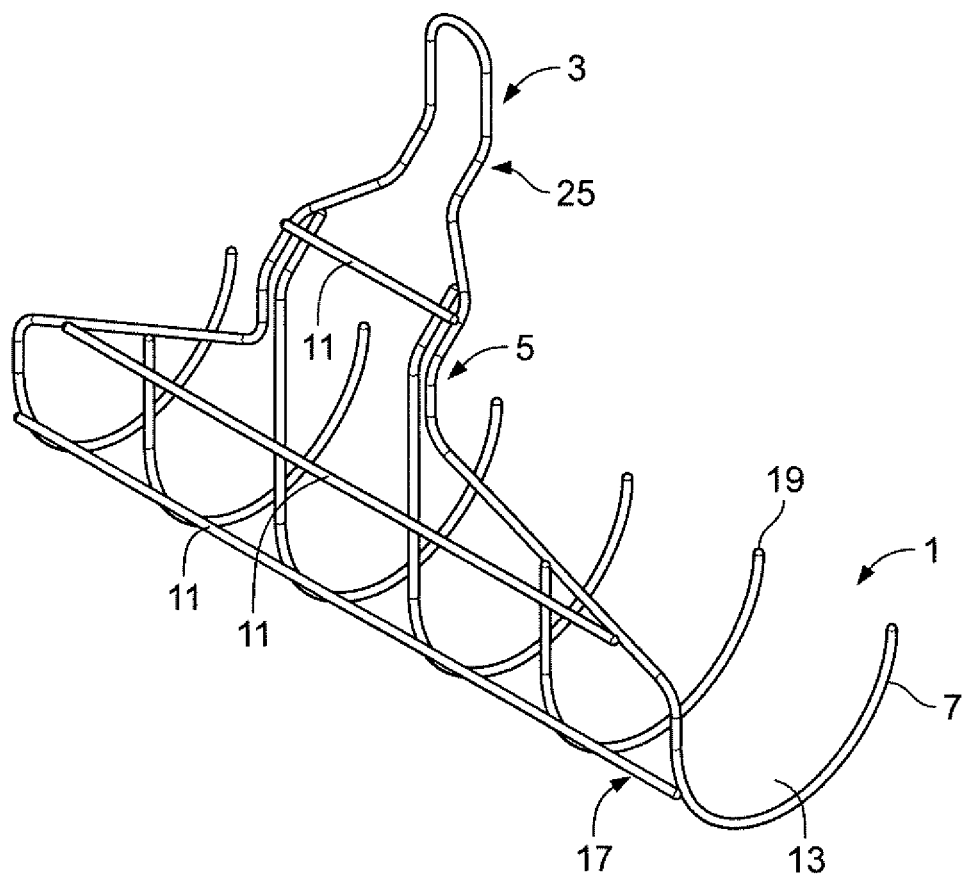
FIG. 2 is a front perspective view of the lifting device of FIG. 1.
Figure 3:
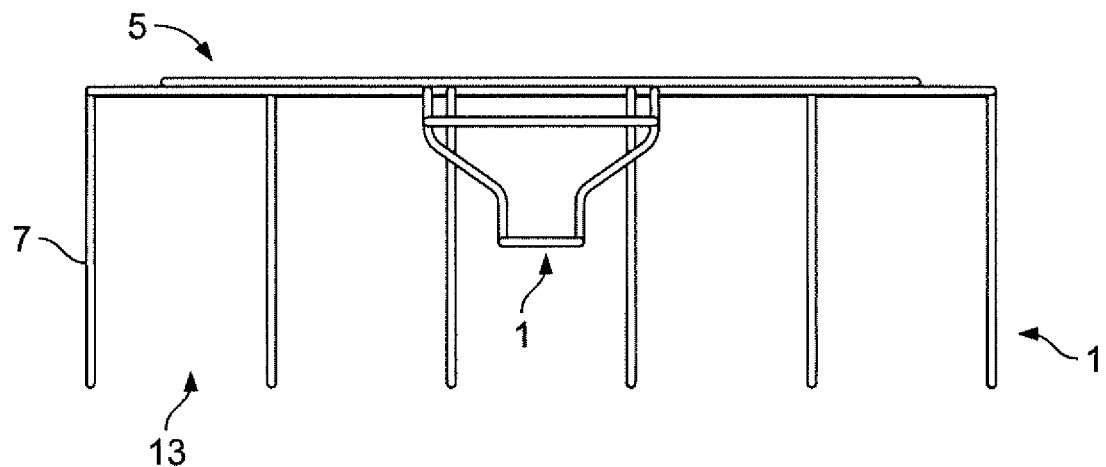
FIG. 3 is a top view of the lifting device of FIG. 1.
Figure 4:
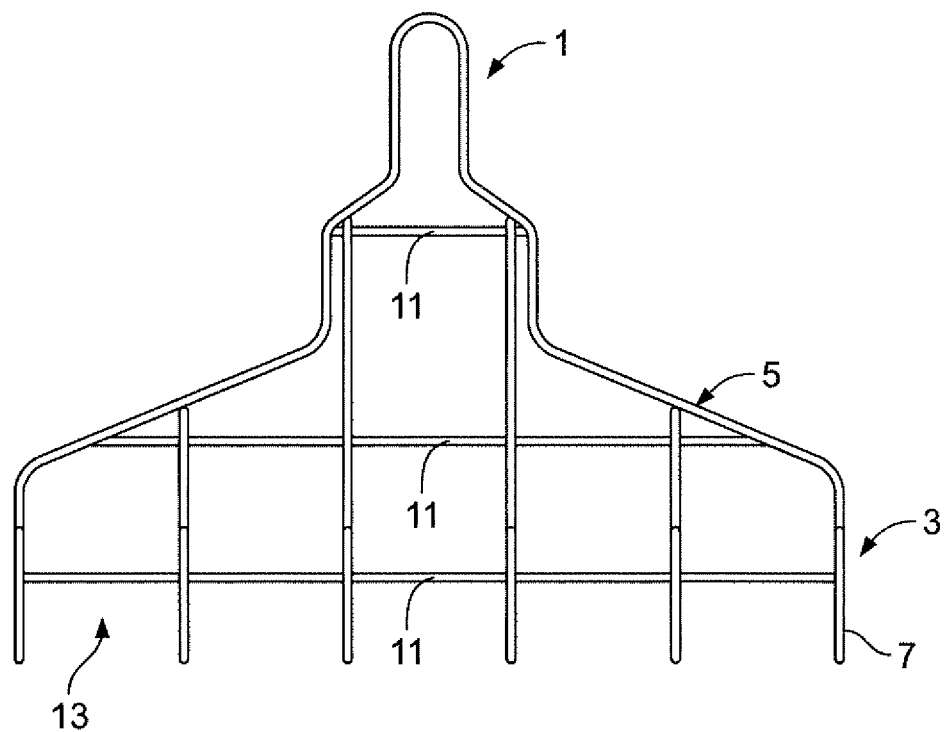
FIG. 4 is a front view of the lifting device of FIG. 1.

The connector 5 also includes an angled section 25 as seen in FIGS. 2 and 5. This angled section 25 terminates at the handle 3 and allows for the handle to be positioned over a center part of the u-shaped portion 1. This centering of the handle 3 over the u-shaped portion 1 means that the handle is essentially over the animal and its center of gravity, thereby making it much easier to lift the animal using the lifting device 10. While not as desirable for lifting purposes, the handle 3 could vertically extend from the connector 5 such that the section 23 is eliminated.

The lifting device 10 can be made out of virtually any material that would be able to support the weight of the animal to be lifted. This includes, metals, plastics, composites, or combinations thereof. In the illustrated embodiment, the device is made with an open design, wherein rod-like elements are used for the u-shaped portion, the connector, and its cross members, and the handle. While the u-shaped portion 1 requires the spaces 13 for carrying the animal, the connector 5 and handle 3 do not have to be open and could be constructed so that the connector 5 was solid walled or screened, instead of open. Likewise, virtually any kind of handle and/or connector design could be used with the u-shaped portion 1 and tines 7 that allow for lifting the small animal.

Figure 6:
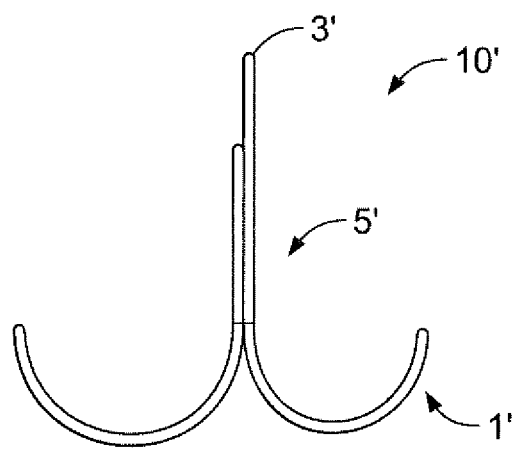
FIG. 6 is a side view of another embodiment of the lifting device of the invention.

While the device of FIGS. 1-5 shows a single u-shaped portion 1, the device would be made with a pair of u-shaped portions 1 and 1', and the handle could then be configured to be aligned with the connector 5. This embodiment is schematically shown in FIG. 6 as lifting device 10'. In this embodiment, instead of the handle being centered over the u-shaped portion so as to align with the center of gravity of the animal to be lifted, the handle 3' is aligned with the connector 5', which aligns effectively with the center of gravity of the device when carrying two animals.

Figure 7:
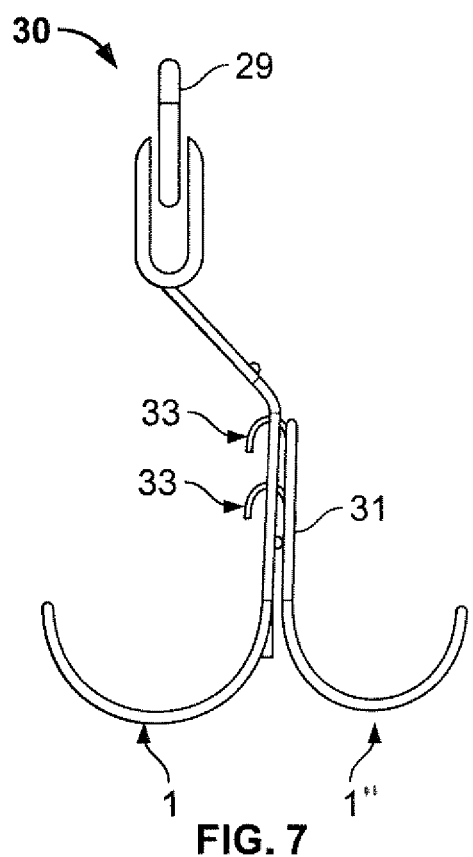
FIG. 7 is a side view of yet another embodiment of the lifting device of the invention.

The embodiment of FIG. 7 discloses a telescoping handle 29, wherein the handle could be made longer to reach animals further from a pen wall. Any known telescoping configuration could be employed for this embodiment.

FIG. 7 also shows yet another embodiment of the inventive lifting device. In this alternative embodiment, a second u-shaped portion 1" and connector 31 (without handle) is employed, designated as secondary lifting attachment 30. This attachment 30 has clips 33, which run along the length of the attachment and are configured to clip to portions of the connector 5 that is situated between the telescoping handle 29 and the first u-shaped portion 1. With this embodiment, two animals can be lifted by merely using the attachment 30 with the lifting device 10 that is designed for a single animal. With the removable attachment 30, the attachment can be kept handy and used with the lifting device 10 if two animals need to be lifted at one time. The weight of the animal on the attachment 30 should be sufficient to keep the clips 33 engaged with the connector 5. However, any kind of a locking attachment device, e.g., a carabiner, could be used as well to secure the connection between the attachment 30 and the connector 5.

Figure 8:
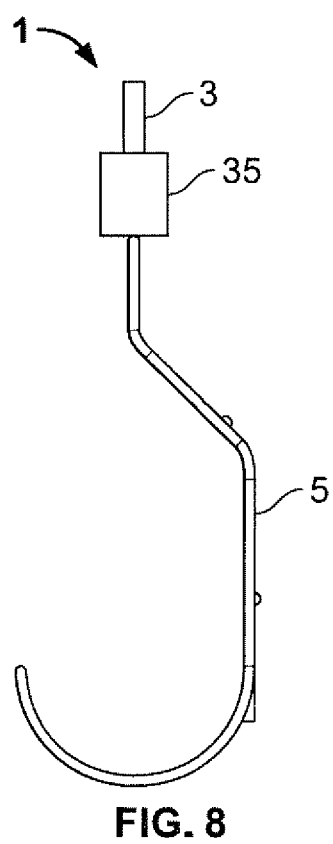
FIG. 8 is a side view of the lifting device with an integrated scale.

The lifting device can also include an integrated scale as shown in the schematic of FIG. 8, wherein the scale 35 is positioned between the handle 3 and the connector 5. The scale can be any known type of a scale, mechanical or electronic. The lifting device can also be used with a scale separate from the lifting device 10, wherein the handle would be attached to the scale for weighing purposes.

The dimensions shown in FIGS. 1-5 are exemplary and other-sized lifting devices could be used. While lamb and kids are one kind of small animal, other animals could also be lifted, some smaller and some larger than typical lambs or kids. Thus, the dimensions shown in the drawing could be change by up to 50% less and up to 100% more than that disclosed.

The invention also includes the method of using the lifting device. This method would entail positioning the u-shaped portion of the device below the body of the small animal intended to be lifted. Once the legs are between the spaces of the tines and the body is nestled in the u-shape portion 1 by positioning of the device by the handler, the handler can then raise the device so that the body of the animal is firmly held in place in the u-shaped portion and the legs of the animal are extending through and beyond the spaces formed by the tines but still touching the ground. The lifting device can be further moved to raise the animal from ground and transport it to any desired location. The lifting method can also include the use of the scale described above, either as part of the lifting device as shown in FIG. 8 or separate therefrom.

The invention provides significant advantages over the prior art devices and methods. By using the inventive lifting device, a small animal, such as a lamb or kid, can be securely lifted up and transported, weighed, tagged and processed; with minimal contact with the animal, and without the handler having to kneel down and handle the animal to get it positioned into the carrier. This process is easily done with one hand controlling the device and orienting it beneath the animal so that its legs protrude down between the fingers/tines of the device. The additional fingers/tines support the animal's body and help it feel secure, while it is being lifted just above the ground and moved ahead of the mother, yet in a natural way so that the mother is not confused as to where her baby or babies went.

Also, picking up a newborn too high causes the mother to lose sight of the newborn, causing the mother to become confused and stressed, which often causes the mother to return to where she gave birth and it becomes more difficult to get the mother to move with the newborn without added stress. With the inventive device, the newborn can be held in a much more natural and visible orientation as compared to a sling so that the mother can maintain contact with the newborn when being moved.

This inventive device is made to be easily carried by hand, hung from a scale or a hook on the side of the pen. As mentioned above, it can be made with an integrated scale into a handle, so transporting and weighing can be accomplished seamlessly in one activity. The scale can be mechanical or electronic and be part of the assembly. The device can also be manufactured to allow for an extension or telescoping handle to allow for a longer reach into a pen or lambing area. As also mentioned above, the device can be made from plastic, composite, steel, or other materials or combinations of materials and can be made to allow for convenient back-to-back use (carrying 2 lambs in one hand) by providing a similar though handle-less device that clips to the back side of a full-scale device, allowing for two carriers from one handle, see FIG. 7.

While the lifting device is intended primarily for lambs and kids, any kind of small animal that is need of transport can be lifted and moved with the inventive device. Moreover, virtually any item, which could be grasped with the tines and fitted into the u-shaped portion 1 could be lifted and moved using the inventive device.

One device can be used at a time, or it is easy to use one in each hand for moving twins. For twins, two separate devices could be used or the device as shown in FIGS. 6 and 7 in terms of the u-shaped portions. For triplets, two devices 10 can be used back-to-back in one hand and a third device can be used in the other hand. The dual animal carrying embodiments of FIGS. 6 and 7 can also be used in connection with a single animal lifting device 10 as shown in FIGS. 1-5. It is even possible to move four newborns at a time, with back-to-back devices 10 in each hand or pairs of the devices of FIG. 6 or 7 or a combination of both kinds of dual animal carrying devices.

As such, an invention has been disclosed in terms of preferred embodiments thereof which fulfills each and every one of the objects of the present invention as set forth above and provides a new and improved lifting device for small animals and the like and a method of use.

Of course, various changes, modifications and alterations from the teachings of the present invention may be contemplated by those skilled in the art without departing from the intended spirit and scope thereof. It is intended that the present invention only be limited by the tears of the appended claims.

I claim:

1. A lifting device, especially for lifting and moving small animals, comprises:
    a handle,
    a u-shaped portion comprising a plurality of u-shaped tines, each u-shaped tine having an arcuate shape and being open-ended for carrying the small animal, each u-shaped tine including a free end, the u-shaped portion including a u-shaped tine at each end thereof, the open ends of the u-shaped tines at each end of the u-shaped portion allowing a portion of the animal to overhang each u-shaped end tine, and
    a connector linking the handle to each of the u-shaped tines of the u-shaped portion, the connector comprising a grid of wires for maintaining the u-shaped tines in a spaced apart relationship to hold the body of a small animal in the u-shaped portion while allowing legs of the small animal to extend through spaces between adjacent u-shaped tines,
    wherein the handle is either vertically aligned with a center part of the u-shaped portion so as to align with a center of gravity of the small animal to ease transport thereof when the small animal is carried by the device,
    wherein each u-shaped tine further comprises a curved bottom portion and first and second upwardly curving opposing leg portions, the first upwardly curving leg portion including the free end, an end of the second upwardly curving leg portion aligned with the free end of the first upwardly curving leg portion, the first and second upwardly curving leg portions and the bottom portion forming the u-shape.

2. The device of claim 1, wherein the device is made from one of metallic, plastic, or composite materials or a combination thereof.

3. The device of claim 1, further comprising a scale device integrated into the handle or connector.

4. A lifting device, especially for lifting and moving small animals, comprises:
    a handle,
    a u-shaped portion comprising a plurality of u-shaped tines, each u-shaped tine having an arcuate shape and being open-ended for carrying the small animal, each u-shaped tine including a free end, the u-shaped portion including a u-shaped tine at each end thereof, the open ends of the u-shaped tines at each end of the u-shaped portion allowing a portion of the animal to overhang each u-shaped end tine, and
    a connector linking the handle to each of the u-shaped tines of the u-shaped portion, the connector maintaining the u-shaped tines in a spaced apart relationship to hold the body of a small animal in the u-shaped portion while allowing legs of the small animal to extend through spaces between adjacent u-shaped tines,
    wherein the handle is either vertically aligned with a center part of the u-shaped portion so as to align with a center of gravity of the small animal to ease transport thereof when the small animal is carried by the device or vertically aligned with the connector, the device further comprising:
    an attachment comprising a second u-shaped portion and a second connector, the attachment configured to attach to the connector to provide first and second u-shaped portions for lifting, the first and second u-shaped portions parallel to each other.

5. A lifting device, especially for lifting and moving small animals, comprises:
    a handle,
    a pair of u-shaped portions, each u-shaped portion comprising a plurality of u-shaped tines, each u-shaped tine including a free end and having an arcuate shape and being open-ended for carrying the small animal, a shape of the u-shaped tines of one of the u-shaped portions generally matching a shape of the u-shaped tines of the other u-shaped portion,
    and
    a connector linking the handle to each of the u-shaped tines of each u-shaped portion of the pair, the connector comprising a grid of wires for maintaining the u-shaped tines of each u-shaped portion in a spaced apart relationship to hold the body of two small animals in the u-shaped portions while allowing legs of the small animals to extend through spaces between adjacent u-shaped tines,
    wherein the handle is vertically aligned with the connector so as to bisect centers of gravity of the small animals to ease transport thereof when the small animals are carried by the device.

6. The device of claim 5, wherein the device is made from one of metallic, plastic, or composite materials or a combination thereof.

7. The device of claim 5, further comprising a scale device integrated into the handle or connector.

8. A method of lifting an animal comprising:
    a) providing the lifting device of claim 7,
    b) positioned tines under a body part of the animal with legs extending through and beyond the tines;
    c) lifting the animal; and
    d) weighing the animal using the scale device.

9. A method of lifting an animal comprising:
    a) providing at least one lifting device of claim 5 or a lifting device comprising a handle,
    a u-shaped portion comprising a plurality of u-shaped tines, each u-shaped tine having an arcuate shape and being open-ended for carrying the small animal, each u-shaped tine including a free end, the u-shaped portion including a u-shaped tine at each end thereof, the open ends of the u-shaped tines at each end of the u-shaped portion allowing a portion of the animal to overhang each u-shaped end tine, and
    a connector linking the handle to each of the u-shaped tines of the u-shaped portion, the connector comprising a grid of wires for maintaining the u-shaped tines in a spaced apart relationship to hold the body of a small animal in the u-shaped portion while allowing legs of the small animal to extend through spaces between adjacent u-shaped tines,
    wherein the handle is either vertically aligned with a center part of the u-shaped portion so as to align with a center of gravity of the small animal to ease transport thereof when the small animal is carried by the device, wherein each u-shaped tine further comprises a curved bottom portion and first and second upwardly curving opposing leg portions, the first upwardly curving leg portion including the free end, an end of the second upwardly curving leg portion aligned with the free end of the first upwardly curving leg portion, the first and second upwardly curving leg portions and the bottom portion forming the u-shape
b) positioning the u-shaped tines under a body part of the animal with legs extending through and beyond the tines; and
c) lifting the animal.

10. The method of claim 9, wherein at least two lifting devices are provided for lifting at least two animals.

* * * * *